US012712283B2

(12) United States Patent
Onaka et al.

(10) Patent No.: US 12,712,283 B2
(45) Date of Patent: Aug. 18, 2026

(54) ANTENNA MODULE AND COMMUNICATION APPARATUS EQUIPPED WITH THE SAME

(71) Applicant: Murata Manufacturing Co., Ltd., Nagaokakyo (JP)

(72) Inventors: Kengo Onaka, Nagaokakyo (JP); Yoshiki Yamada, Nagaokakyo (JP); Hirotsugu Mori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 18/673,748

(22) Filed: May 24, 2024

(65) Prior Publication Data

US 2024/0313423 A1 Sep. 19, 2024

Related U.S. Application Data

(63) Continuation of application No. PCT/JP2022/042079, filed on Nov. 11, 2022.

(30) Foreign Application Priority Data

Dec. 3, 2021 (JP) ................................ 2021-196815

(51) Int. Cl.
*H01Q 21/06* (2006.01)
*H01Q 9/04* (2006.01)
*H01Q 21/08* (2006.01)

(52) U.S. Cl.
CPC .......... *H01Q 21/065* (2013.01); *H01Q 9/045* (2013.01); *H01Q 21/08* (2013.01)

(58) Field of Classification Search
CPC ...... H01Q 21/065; H01Q 9/045; H01Q 21/08; H01Q 1/24; H01Q 23/00; H01Q 1/52; G01S 7/28; H04B 1/26
See application file for complete search history.

(56) References Cited

U.S. PATENT DOCUMENTS

2017/0222316 A1* 8/2017 Mizunuma .......... H01Q 21/062
2018/0205155 A1* 7/2018 Mizunuma .............. H01Q 3/26
2019/0238169 A1* 8/2019 Naniwa ................. H04B 1/006
2020/0243957 A1* 7/2020 Ueda ....................... H01Q 1/38
2023/0411869 A1* 12/2023 Jang ...................... H01Q 5/378

FOREIGN PATENT DOCUMENTS

JP 2017-215309 A 12/2017
JP 2019-161631 A 9/2019
JP 2020-123946 A 8/2020

OTHER PUBLICATIONS

International Search Report and Written Opinion mailed on Jan. 31, 2023, received for PCT Application PCT/JP2022/042079, filed on Nov. 11, 2022, 8 pages including English Translation of the International Search Report.

* cited by examiner

*Primary Examiner* — Jason M Crawford
*Assistant Examiner* — Jose A. Miranda Gonzalez
(74) *Attorney, Agent, or Firm* — XSENSUS LLP

(57) ABSTRACT

An antenna module includes a first substrate, a power supply circuit, and an external connection terminal. Transmission lines that transmit a control signal, an intermediate frequency signal, and a Local signal and filter circuits are provided between the power supply circuit and the external connection terminal.

20 Claims, 11 Drawing Sheets

| FREQUENCY BAND | |
|---|---|
| PATCH ANTENNA 121 | 38.5GHz |
| PATCH ANTENNA 122 | 28GHz |
| INTERMEDIATE FREQUENCY (IF) SIGNAL | 8GHz～15GHz |
| CONTROL (ctrl) SIGNAL | 600 MHz OR LESS |
| LOCAL SIGNAL | 600 MHz OR LESS |

ANTENNA MODULE AND COMMUNICATION APPARATUS EQUIPPED WITH THE SAME

CROSS-REFERENCE TO RELATED APPLICATIONS

This is a continuation application of PCT/JP2022/042079, filed on Nov. 11, 2022, designating the United States of America, which is based on and claims priority to Japanese Patent Application No. JP 2021-196815, filed on Dec. 3, 2021. The entire contents of the above-identified applications, including the specifications, drawings and claims, are incorporated herein by reference in their entirety.

The present disclosure relates to an antenna module and a communication apparatus equipped with the same, and more specifically, to a technique for improving antenna characteristics.

BACKGROUND

An antenna module may include an integrated circuit (IC) that converts an intermediate frequency signal into a high frequency signal and transmits the converted signal to an antenna, and a filter that is capable of filtering of an intermediate frequency signal. The IC receives an intermediate frequency signal from the outside of the antenna module.

SUMMARY

An antenna module according to the present disclosure includes a radiating element that emits a radio wave in a first frequency band; a first substrate at which the radiating element is disposed; a power supply circuit that is connected to the radiating element; an external connection terminal that is electrically connected to an external substrate; a transmission line that transmits a control signal output from the external substrate and an intermediate frequency signal corresponding to a radio wave emitted from the radiating element from the external connection terminal to the power supply circuit; and a filter circuit that is provided at the transmission line and blocks a signal in a second frequency band. The second frequency band is lower than a frequency band of the intermediate frequency signal and higher than a frequency band of the control signal.

DETAILED DESCRIPTION

Figure 1:
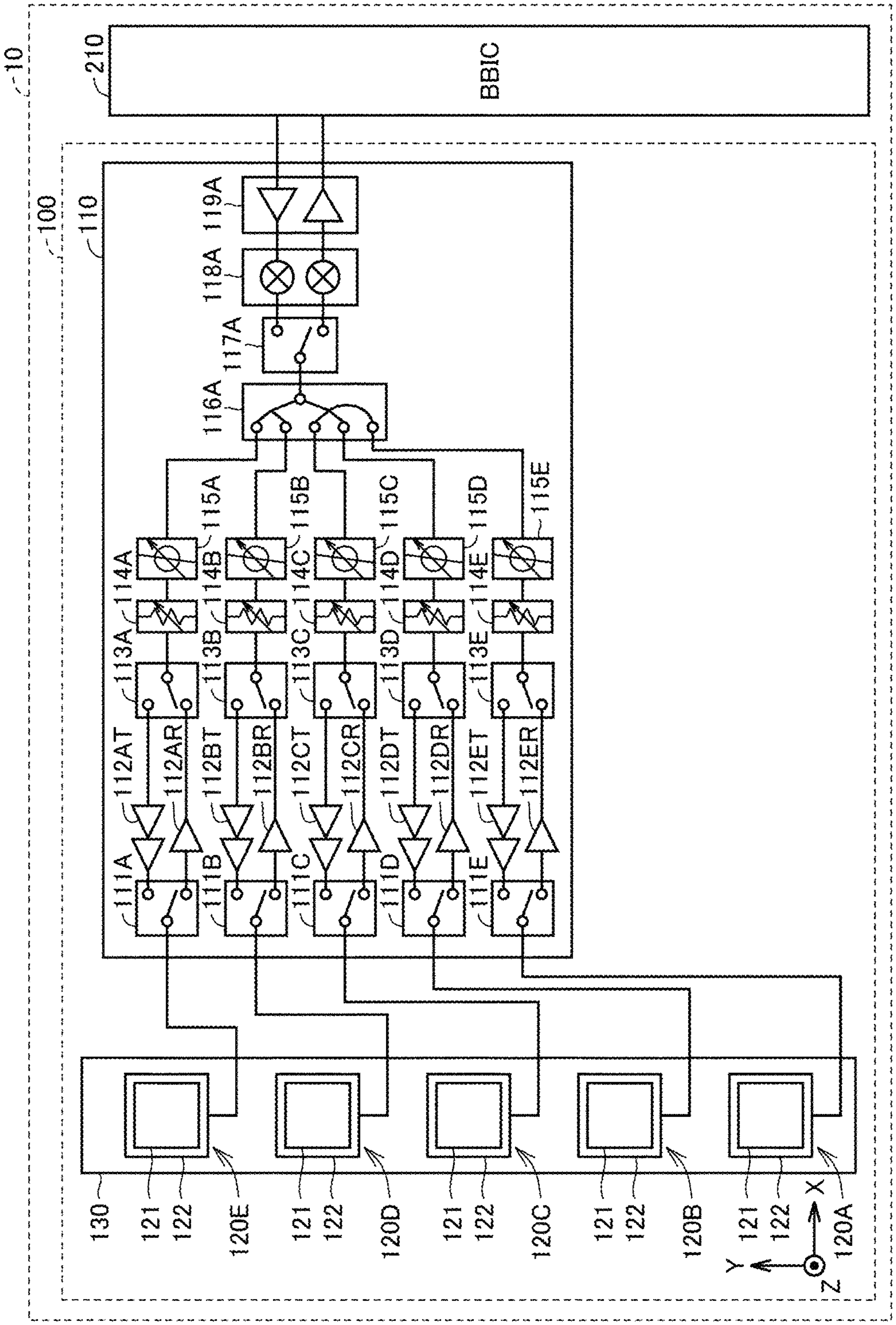
FIG. 1 is a block diagram of a communication apparatus for which an antenna module according to a first exemplary embodiment is used.

Hereinafter, exemplary embodiments of the present disclosure will be described in detail with reference to drawings. The same or corresponding parts in the drawings are denoted by the same signs and a description of those parts will not be repeated.

In recent years, an attempt to increase communication speed and improve communication quality has been made by using signals in a millimeter wave band of frequencies (several tens of GHz) higher than signals at frequencies in a 6 GHz band, which has been used conventionally.

In such an attempt, there has been an increased demand for antenna modules supporting radio waves in a millimeter wave band. Since frequencies in the conventional 6 GHz band have been continuously used, there has been a high need for communication apparatuses capable of using frequencies in the 6 GHz band as well as the frequencies in the millimeter wave band.

Such communication apparatuses process radio waves in a first frequency band, such as the millimeter wave band, and radio waves in a second frequency band, such as the 6 GHz band, which is lower than the first frequency band. Thus, in the case where an antenna module supporting radio waves in the first frequency band is included in a communication apparatus, radio waves in the second frequency band may propagate to the antenna module. When the antenna module receives, from the outside, a control signal for controlling an RFIC, an intermediate frequency signal, and the like, a radio wave in the second frequency band may act as noise for the signals mentioned above. Thus, radio waves in the second frequency band may degrade antenna characteristics of the antenna module.

The present disclosure has been designed to solve at least the situation mentioned above, and an aspect of the present disclosure is to reduce noise that may be generated in an antenna module to which signals in different frequency bands are supplied.

According to the present disclosure, noise that may be generated in an antenna module to which signals in different frequency bands are supplied can be reduced.

First Exemplary Embodiment (Basic Configuration of Communication Apparatus)

FIG. 1 is an example of a block diagram of a communication apparatus 10 for which an antenna module 100 according to a first exemplary embodiment is used. The communication apparatus 10 is, for example, a portable terminal such as a mobile phone, a smartphone, or a tablet, a personal computer provided with a communication function, a base station, or the like. Frequency bands of radio waves used for the antenna module 100 according to this exemplary embodiment are, for example, millimeter wave bands with center frequencies of, for example, 28 GHz and 39 GHz. Radio waves in frequency bands different from 28 GHz and 39 GHz may also be used for the antenna module 100 according to this exemplary embodiment.

Referring to FIG. 1, the communication apparatus 10 includes the antenna module 100 and a base band integrated circuit (BBIC) 210 configuring a baseband signal processing circuit. The antenna module 100 includes a dielectric substrate 130 at which five radiating elements 120A to 120E are arranged and a radio frequency integrated circuit (RFIC) 110, which is an example of a power supply circuit. Hereinafter, the radiating elements 120A to 120E may be comprehensively referred to as "radiating elements 120".

The radiating elements 120A to 120E have the same configurations. Each of the radiating elements 120A to 120E includes a pair of patch antennas 121 and 122 with different sizes. The patch antennas 121 and 122 each have a substantially square flat plate shape. Thus, each of the radiating elements 120 is an element with a planar shape. The element with the planar shape is not necessarily an element with a rectangular shape and may be an element with a circle or oval shape or an element with other types of polygons such as hexagon.

The BBIC 210 transmits to the antenna module 100 an intermediate frequency (IF) signal and a control signal for controlling the RFIC 110 and other elements. The RFIC 110 up-converts, in accordance with a control signal, an intermediate frequency signal into a radio frequency (RF) signal. The RF signal is emitted from a radiating element 120. The RFIC 110 down-converts an RF signal received at a radiating element 120 and transmits the down-converted signal to the BBIC 210.

A circuit configuration of the RFIC 110 will be described.

The RFIC 110 includes five signal paths. Signals on the signal paths are distributed to the radiating elements 120A to 120E.

The RFIC 110 includes switches 111A to 111E, 113A to 113E, and 117A, power amplifiers 112AT to 112ET, low noise amplifiers 112AR to 112ER, attenuators 114A to 114E, phase shifters 115A to 115E, a signal multiplexer/demultiplexer 116A, a mixer 118A, and an amplifying circuit 119A.

For transmission of RF signals, the switches 111A to 111E and 113A to 113E are switched to the power amplifiers 112AT to 112ET side and the switch 117A is connected to a transmission-side amplifier in the amplifying circuit 119A. For reception of RF signals, the switches 111A to 111E and 113A to 113E are switched to the low noise amplifiers 112AR to 112ER side and the switch 117A is connected to a reception-side amplifier in the amplifying circuit 119A.

A signal transmitted from the BBIC 210 is amplified by the amplifying circuit 119A and up-converted by the mixer 118A. A transmission signal, which is the up-converted RF signal, is divided into five signals by the signal multiplexer/demultiplexer 116A. The divided signals travel through the five signal paths and are supplied to the radiating elements 120A to 120E. At this time, the degrees of phase shift of the phase shifters 115A to 115E, which are disposed at the signal paths, are adjusted individually, and the directivity of the entire antenna module 100 is thus configured to be adjusted. Furthermore, the attenuators 114A to 114E adjust a strength of transmission signals.

Reception signals, which are RF signals received at the radiating elements 120A to 120E, travel through different five signal paths and are combined by the signal multiplexer/demultiplexer 116A. The combined reception signal is down-converted by the mixer 118A, amplified by the amplifying circuit 119A, and transmitted to the BBIC 210.

(Configuration of Antenna Module)

Figure 2:
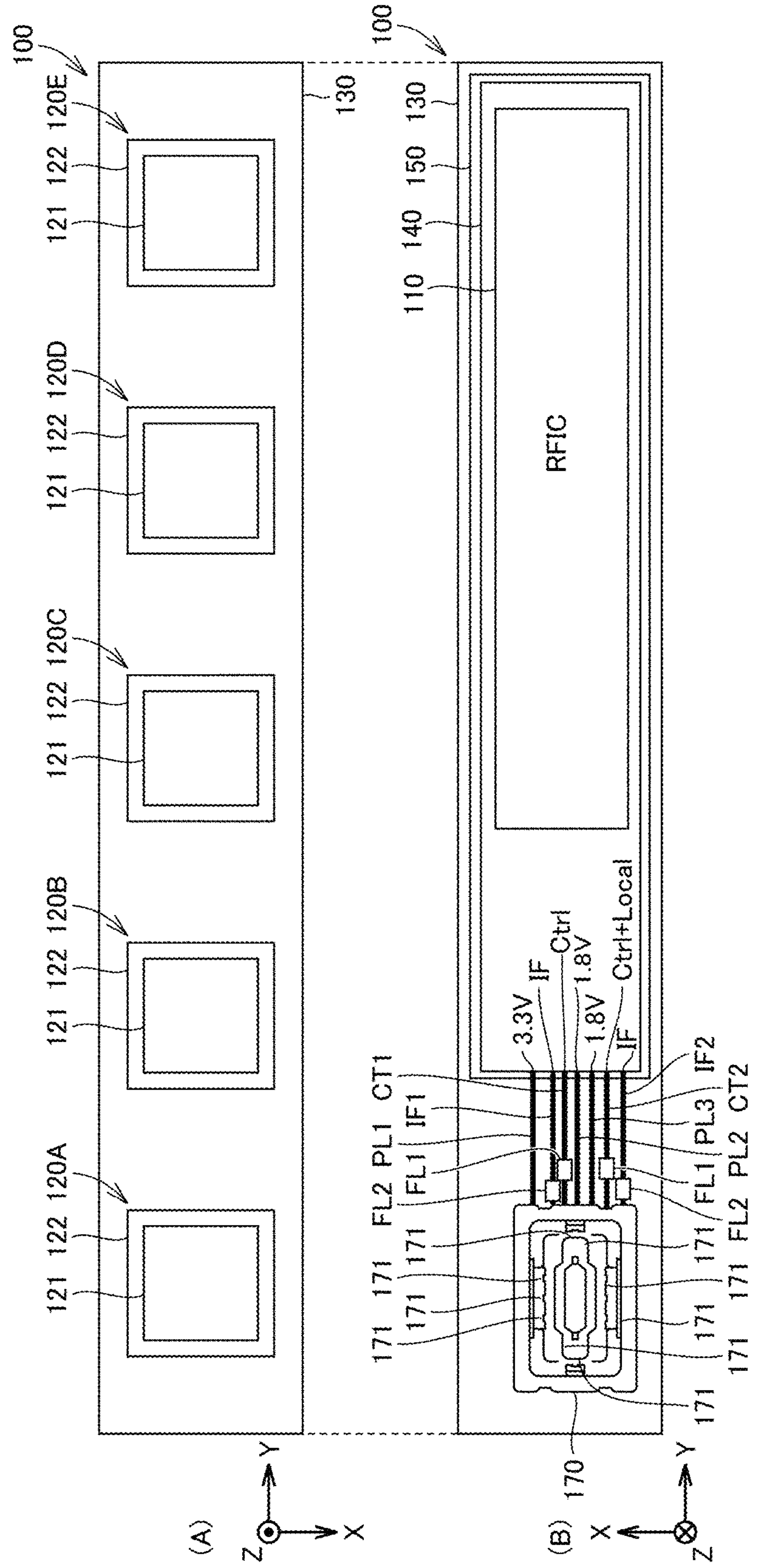
FIG. 2 includes a top view and a bottom view of the antenna module.

FIG. 2 includes a top view and a bottom view of the antenna module 100.

In FIG. 2(A), the top view of the antenna module 100 is illustrated. In FIG. 2(B), the bottom view of the antenna module 100 is illustrated.

The antenna module 100 includes the dielectric substrate 130, the radiating elements 120A to 120E, a system in package (SiP) 150, and a connector 170. Hereinafter, as illustrated in drawings, a normal line direction of a main surface of the dielectric substrate 130 may be referred to as a "Z-axis direction", a longitudinal direction of the dielectric substrate 130 that is perpendicular to the Z-axis direction may be referred to as a "Y-axis direction", and a direction perpendicular to both the Y-axis direction and the Z-axis direction may be referred to as an "X-axis direction". Furthermore, hereinafter, description may be provided by defining a Z-axis positive direction as a top surface side and a Z-axis negative direction as a bottom surface side in the drawings.

The dielectric substrate 130 has a rectangular shape when seen in plan view from the normal line direction (Z-axis direction). As illustrated in FIG. 2(A), the radiating elements 120A to 120E are arranged to be equally spaced at the dielectric substrate 130 in the Y-axis direction. Each of the radiating elements 120A to 120E includes the pair of patch antennas 121 and 122. The radiating elements 120A to 120E are disposed near the top surface of the dielectric substrate 130 inside the dielectric substrate 130. The radiating elements 120A to 120E may be arranged so as to be exposed out of the top surface of the dielectric substrate 130.

A ground electrode GND is disposed near the entire bottom surface of the dielectric substrate 130.

The dielectric substrate 130 is, for example, a rigid substrate. The dielectric substrate 130 is, for example, a low temperature co-fired ceramic (LTCC) multilayer substrate. The dielectric substrate 130 may be a multilayer resin substrate formed of laminated resin layers made of resin such as epoxy or polyimide.

The dielectric substrate 130 may be a multilayer resin substrate formed of laminated resin layers made of liquid crystal polymer (LCP) having a lower permittivity. The dielectric substrate 130 may be a multilayer resin substrate formed of laminated resin layers made of fluorine-based resin, a multilayer resin substrate formed of laminated resin layers made of a polyethylene terephthalate (PET) material, or a ceramic multilayer substrate made of a material different from LTCC.

The dielectric substrate 130 does not necessarily have a multilayer structure and may be a single layer substrate. As illustrated in FIG. 2(B), the SiP 150 and the connector 170 are disposed on the bottom surface side of the dielectric substrate 130. A package of chips such as a processor, a memory, and the like is sealed in the SiP 150. The SiP 150 includes a substrate 140 at which the RFIC 110 is mounted. The RFIC 110 is electrically connected to the radiating elements 120A to 120E. The SiP 150 may include a power management integrated circuit (PMIC), a power inductance, and the like. The substrate 140 is an example of a second substrate at which the RFIC 110 is disposed. The RFIC 110 may be mounted at the dielectric substrate 130 instead of the substrate 140.

The substrate 140 is not necessarily provided in the SiP 150. A circuit such as the RFIC 110 may be sealed with resin inside the SiP 150.

The connector 170 is disposed on the bottom surface side of the dielectric substrate 130. The connector 170 may be disposed on the top surface side of the dielectric substrate 130. The connector 170 is, for example, a multi-pole connector. A plurality of terminals 171 are provided at the connector 170.

Wires CT1, CT2, IF1, IF2, PL1, PL2, and PL3 for connecting the terminals 171 of the connector 170 to the SiP 150 are formed at the dielectric substrate 130. Low pass filters FL1 are provided at the wires CT1 and CT2. High pass filters FL2 are provided at the wires IF1 and IF2.

Figure 3:
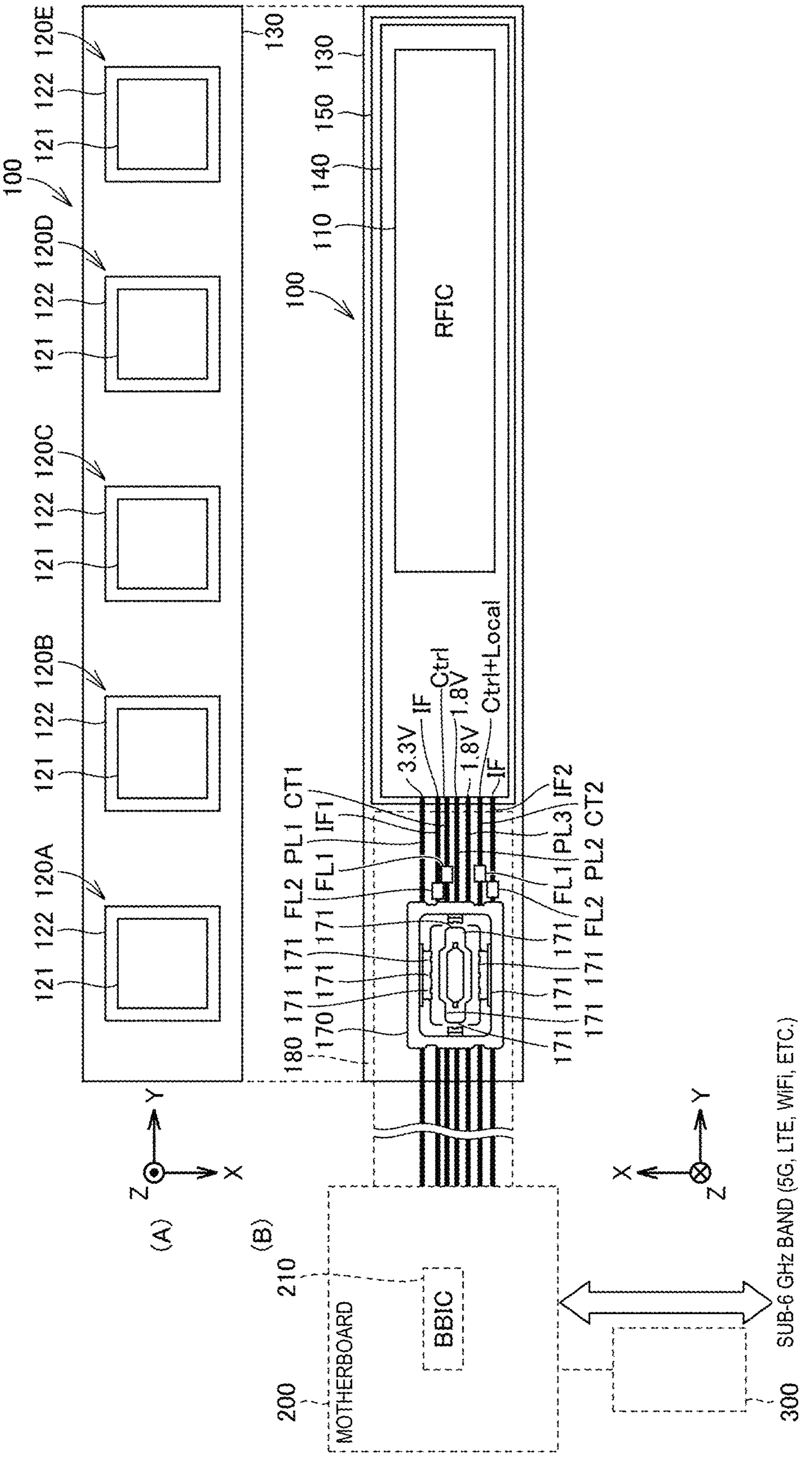
FIG. 3 includes diagrams illustrating an example in which a motherboard is connected to the antenna module with a flexible substrate interposed therebetween.

FIG. 3 is a diagram illustrating an example in which a motherboard 200 is connected to the antenna module 100 with a flexible substrate 180 interposed therebetween. The communication apparatus 10 illustrated in FIG. 1 may be configured to include the motherboard 200 with the flexible substrate 180 interposed therebetween. A plurality of terminals (not illustrated in the drawing) fitted to the connector 170 and a plurality of wires for connecting the plurality of terminals to the motherboard 200 are provided at the flexible substrate 180.

For example, the BBIC 210 illustrated in FIG. 1 is mounted on the motherboard 200. A control signal, a Local signal, an intermediate frequency signal, and the like are transmitted from the motherboard 200 to the antenna module 100. A control signal is, for example, a signal for controlling the RFIC 110 disposed inside the SiP 150. A control signal may be a signal for controlling a PMIC disposed inside the SiP 150.

The flexible substrate 180 relays signals such as a control signal, a Local signal, an intermediate frequency signal from the motherboard 200 and transmits these signals to the connector 170. Thus, the connector 170 is electrically connected to the motherboard 200. The motherboard 200 may be configured to be directly connected to the connector 170 without the flexible substrate 180 interposed therebetween.

A control signal is transmitted by the wire CT1, out of the plurality of wires for connecting the terminals 171 of the connector 170 to the SiP 150. A control signal and a Local signal are superimposed on each other and transmitted by the wire CT2. A Local signal is multiplied by an intermediate frequency signal at the mixer 118A. Thus, a signal in a desired millimeter wave band is generated. The frequency band of a Local signal is 600 MHz or less.

A control signal and a Local signal may be superimposed on each other and transmitted by the wire CT1, instead of the wire CT2. An intermediate frequency signal and a Local signal may be superimposed on each other and transmitted by the wire IF1 or the wire IF2, instead of the wire CT2.

An intermediate frequency signal is transmitted by the wires IF1 and IF2. The wire PL1 is a power supply line corresponding to 3.3 V. The wires PL2 and PL3 are power supply lines corresponding to 1.8 V.

An antenna module 300 that transmits and receives radio waves in a Sub-6 GHz band, which is lower than frequencies in a millimeter wave band, is connected to the motherboard 200. Thus, radio waves in the Sub-6 GHz band are input to the motherboard 200. A BBIC for controlling the antenna module 300 may be provided at the motherboard 200, separately from the BBIC 210. The BBIC 210 may control the antenna module 300.

Radio waves in the Sub-6 GHz band input to the motherboard 200 may be propagated through the flexible substrate 180 and the connector 170 to the antenna module 100. Therefore, the radio waves in the Sub-6 GHz input to the motherboard 200 may act as noise for a control signal, a Local signal, and an intermediate frequency signal. Thus, in this exemplary embodiment, as countermeasures against the noise, the low pass filters FL1 are provided at the wires CT1 and CT2 that transmit a control signal, and the high pass filters FL2 are provided at the wires IF1 and IF2 that transmit an intermediate frequency signal.

The wires CT1, CT2, IF1, and IF2 are examples of transmission lines that transmit a control signal, a Local signal, and an intermediate frequency signal from the connector 170 to the RFIC 110. The wires CT1 and CT2 are examples of first lines at which first filter circuits for blocking signals at frequencies higher than the frequency band of a control signal are provided. The wires IF1 and IF2 are examples of second lines at which second filter circuits for blocking signals at frequencies lower than the frequency band of an intermediate frequency signal are provided.

The wires CT1, CT2, IF1, IF2, PL1, PL2, and PL3 may be provided along the bottom surface of the dielectric substrate 130 or may be formed as wiring patterns inside the dielectric substrate 130. The low pass filters FL1 and the high pass filters FL2 are provided, together with the wires CT1 and CT2 and the wires IF1 and IF2, on the bottom surface of the dielectric substrate 130 or inside the dielectric substrate 130.

For example, in the case where the low pass filters FL1 and the high pass filters FL2 are implemented by chip components, the low pass filters FL1 and the high pass filters FL2 may be mounted on the bottom surface of the dielectric substrate 130. In the case where the low pass filters FL1 and the high pass filters FL2 are implemented by distributed constant lines such as short stubs, the low pass filters FL1 and the high pass filters FL2 may be formed of wiring patterns inside the dielectric substrate 130.

Figures 4, 5:
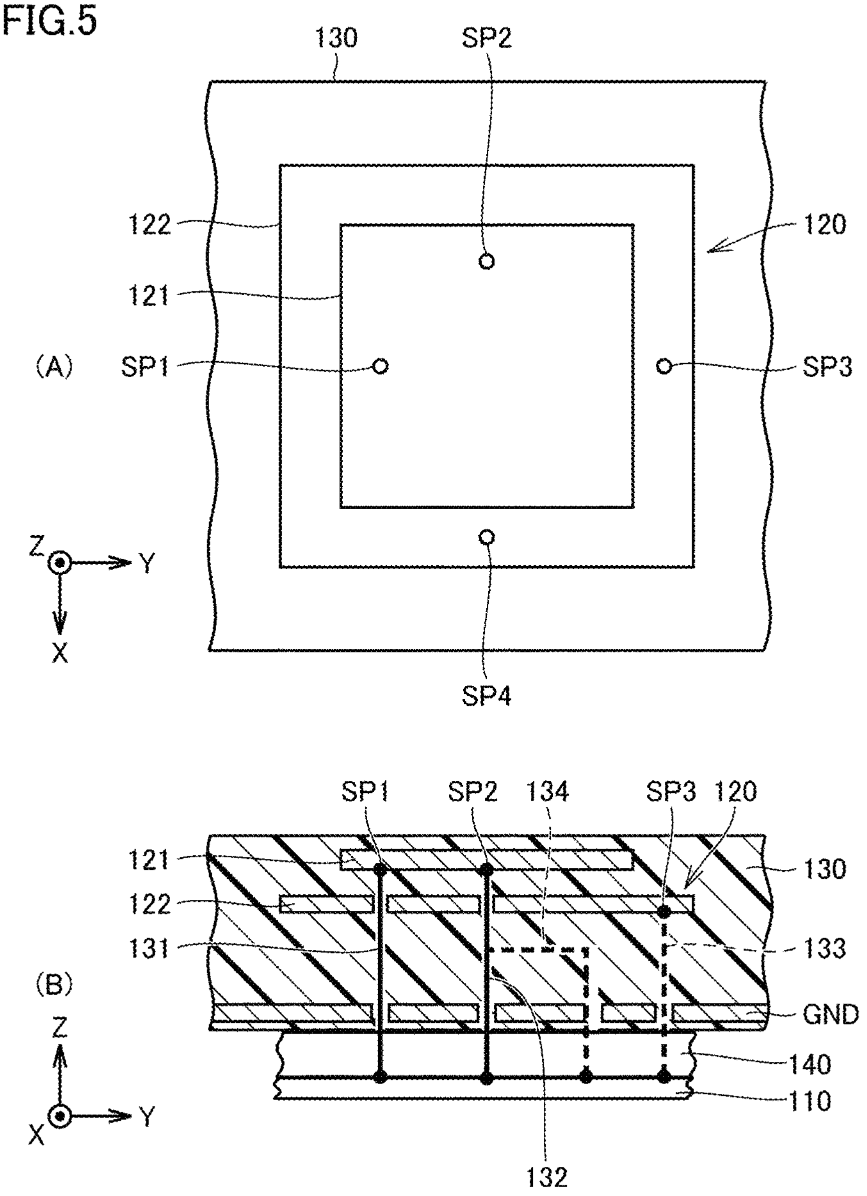
FIG. 4 is a diagram illustrating frequency bands of patch antennas configuring a radiating element, an intermediate frequency signal, a control signal, and a Local signal.
FIG. 5 includes a plan view and a side perspective view of a radiating element.

The frequency band of radiating elements 120 used in the antenna module 100, the frequency band of an intermediate frequency signal, the frequency band of a control signal, and the frequency band of a Local signal will be described below with reference to FIG. 4. FIG. 4 is a diagram illustrating frequency bands of the patch antennas 121 and 122 configuring a radiating element 120, an intermediate frequency signal, a control signal, and a Local signal.

The radiating element 120 is an antenna that includes the patch antennas 121 and 122 and outputs radio waves in a millimeter wave band. The frequency band of the patch antenna 121 is 38.5 GHz. The frequency band of the patch antenna 122 is 28 GHz. The frequency band of radio waves emitted from the radiating element 120 may range from 24 GHz to 43 GHz. The frequency band of an intermediate frequency signal input to the antenna module 100 from the motherboard 200 is, for example, from 8 GHz to 15 GHz. The frequency bands of a control signal and a Local signal input to the antenna module 100 from the motherboard 200 are, for example, 600 MHz or less. It is desirable that the frequency band of a Local signal does not overlap the frequency band of the Sub-6 GHz band.

The Sub-6 GHz band falls within the range from 500 MHz to 6 GHz. Typically, radio waves at 3.7 GHz, 4.5 GHz, or the like are used as radio waves in the Sub-6 GHz band. The Sub-6 GHz band mentioned above will be compared with the frequency bands illustrated in FIG. 4. The Sub-6 GHz band is higher than the frequency bands of a control signal and a Local signal. The Sub-6 GHz band is lower than the frequency bands of the patch antennas 121 and 122 and the frequency band of an intermediate frequency signal.

In this exemplary embodiment, by providing the low pass filters FL1, which pass signals at frequencies corresponding to a control signal and a Local signal and block signals in the 6 GHz band, at the wires CT1 and CT2 that transmit a control signal and a Local signal, noise in the 6 GHz band that may be superimposed on a control signal can be removed.

In this exemplary embodiment, by providing the high pass filters FL2, which pass signals at a frequency corresponding to an intermediate frequency signal and block signals in the 6 GHz band, at the wires IF1 and IF2 that transmit an intermediate frequency signal, noise in the 6 GHz band that may be superimposed on an intermediate frequency signal can be removed.

(Configuration of Radiating Element)

FIG. 5 includes a plan view and a side perspective view of a radiating element 120. In FIG. 5(A), the plan view of the radiating element 120 mounted at the dielectric substrate 130 is illustrated. In FIG. 5(B), the side perspective view of the radiating element 120 mounted at the dielectric substrate 130 is illustrated.

The antenna module 100 includes power supply wires 131 to 134 and the ground electrode GND, in addition to the RFIC 110, the radiating elements 120, and the dielectric substrate 130. The RFIC 110 is mounted, together with various circuits not illustrated in the drawing, at the substrate 140 sealed inside the SiP 150.

The ground electrode GND, which is disposed near the entire bottom surface of the dielectric substrate 130, faces the radiating elements 120.

The power supply wires 131 to 134 connect the RFIC 110 to power supply points of the radiating elements 120 with the substrate 140 interposed therebetween. The power supply wires 131 to 134 penetrate through the ground electrode GND. RF signals from the RFIC 110 are transmitted through the power supply wires 131 to 134 to the radiating elements 120.

Each of the radiating elements 120 includes the pair of patch antennas 121 and 122. The patch antenna 121 is arranged to be horizontal with respect to a plane formed by the X axis and the Y axis in such a manner that two opposing sides of the patch antenna 121 are parallel to the X axis or the Y axis. The patch antenna 122 is arranged in a similar manner. Furthermore, the patch antenna 121 and the patch antenna 122 are arranged such that the center position of the patch antenna 121 and the center position of the patch antenna 122 overlap in the Z-axis direction.

The patch antenna 121 is disposed at a position closer to the top surface side of the dielectric substrate 130 than the patch antenna 122 is. The flat plate size of the patch antenna 121 is smaller than the flat plate size of the patch antenna 122. The frequency of a radio wave output from the patch antenna 121 is higher than the frequency of a radio wave output from the patch antenna 122. The patch antenna 121 outputs, for example, radio waves in a millimeter wave band with a center frequency of 39 GHz. The patch antenna 122 outputs, for example, radio waves in a millimeter wave band with a center frequency of 28 GHz.

Two power supply points SP1 and SP2 are formed at the patch antenna 121. The power supply point SP1 is offset from the center of the patch antenna 121 in the Y-axis direction, and the power supply point SP2 is offset from the center of the patch antenna 121 in the X-axis direction. Thus, a radio wave polarized in the X-axis direction and a radio wave polarized in the Y-axis direction are emitted from the patch antenna 121.

The power supply point SP1 of the patch antenna 121 is connected, by the power supply wire 131, to the RFIC 110 with the substrate 140 interposed therebetween. The power supply point SP2 of the patch antenna 121 is connected, by the power supply wire 132, to the RFIC 110 with the substrate 140 interposed therebetween.

Two power supply points SP3 and SP4 are formed at the patch antenna 122. The power supply point SP3 is offset from the center of the patch antenna 122 in the Y-axis direction, and the power supply point SP4 is offset from the center of the patch antenna 122 in the X-axis direction. Thus, a radio wave polarized in the X-axis direction and a radio wave polarized in the Y-axis direction are emitted from the patch antenna 122.

The power supply point SP3 of the patch antenna 122 is connected, by the power supply wire 133, to the RFIC 110 with the substrate 140 interposed therebetween. The power supply point SP4 of the patch antenna 122 is connected, by the power supply wire 134, to the RFIC 110 with the substrate 140 interposed therebetween.

As described above, the patch antenna 121 outputs radio waves in the millimeter wave band with the center frequency of 39 GHz, and the patch antenna 122 outputs radio waves in the millimeter wave band with the center frequency of 28 GHz.

Thus, the radiating element 120 including the pair of patch antennas 121 and 122 is a dual-polarization, dual-band type antenna. As illustrated in FIG. 1, the five radiating elements 120 of such a dual-polarization, dual-band type antenna are mounted at the antenna module 100.

In the case where radio waves polarized in the X-axis direction are referred to as vertically (V) polarized waves and radio waves polarized in the Y-axis direction are referred to as horizontally (H) polarized waves, the radiating elements 120 can be defined as radiating elements capable of emitting radio waves having V polarization and radio waves having H polarization.

Figure 6:
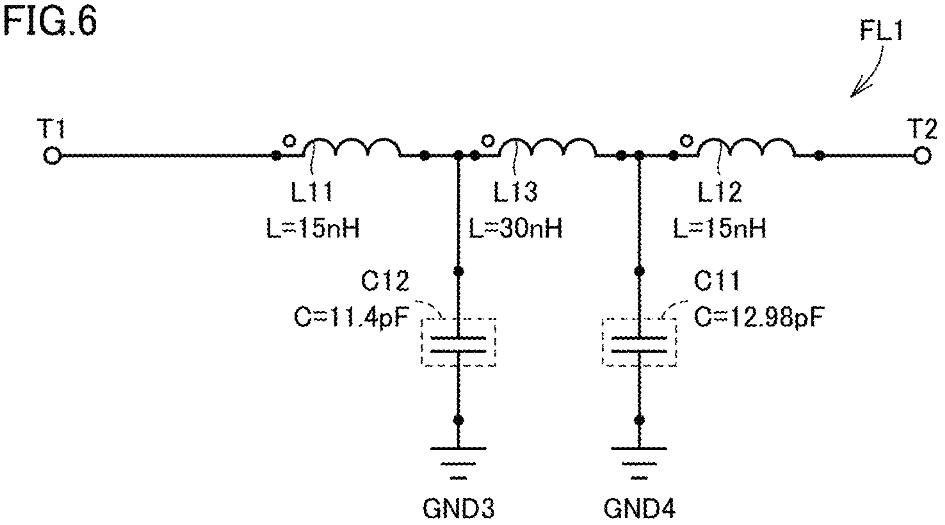
FIG. 6 is a diagram illustrating an example of a low pass filter used for the antenna module.

FIG. 6 is a diagram illustrating an example of a low pass filter FL1 used for the antenna module 100. The low pass filter FL1 includes an input terminal T1, an output terminal T2, inductors L11, L12, and L13, and capacitors C11 and C12. The input terminal T1 corresponds to a terminal 171 of the connector 170. The output terminal T2 corresponds to an input end of the SiP 150 for a wire between the connector 170 and the SiP 150.

The inductors L11, L12, and L13 are connected in series between the input terminal T1 and the output terminal T2. The capacitor C11 is connected between a connection point of the inductor L12 and the inductor L13 and a ground terminal GND4. The capacitor C12 is connected between a connection point of the inductor L11 and the inductor L13 and a ground terminal GND3.

The inductance of the inductor L11 is 15 nH (nano Henry). The inductance of the inductor L12 is 15 nH. The inductance of the inductor L13 is 30 nH.

The capacitance of the capacitor C11 is 12.98 pF (pico Farad). The capacitance of the capacitor C12 is 11.4 pF.

Since the frequency bands of a control signal and a Local signal are 600 MHz or less, the inductors L11, L12, and L13 may form a low pass filter as the low pass filter FL1 illustrated in FIG. 6, without the capacitors C11 and C12 being included.

Figure 7:
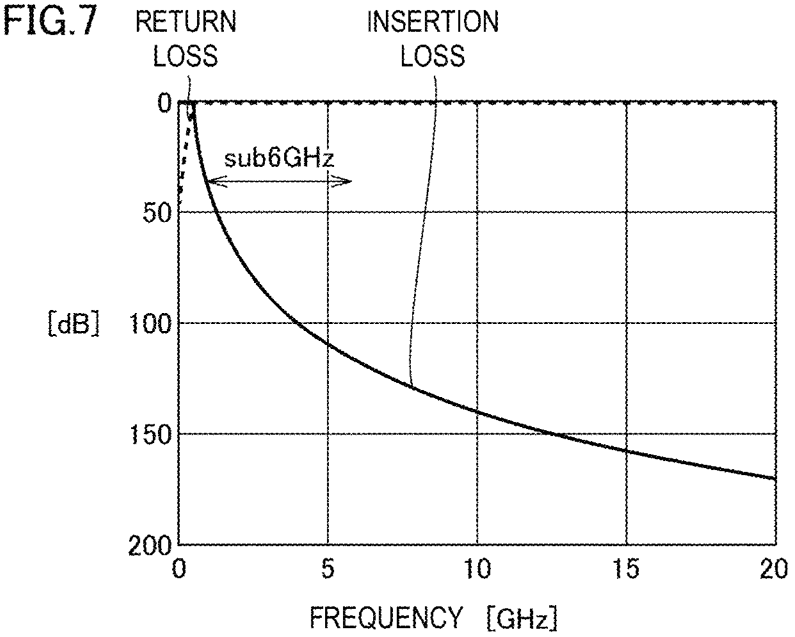
FIG. 7 is a diagram illustrating bandpass characteristics of the low pass filter illustrated in FIG. 6.

FIG. 7 is a diagram illustrating bandpass characteristics of the low pass filter FL1 illustrated in FIG. 6. In FIG. 7, the horizontal axis represents frequency and the vertical axis represents insertion loss and return loss of the low pass filter FL1.

As illustrated in FIG. 7, the low pass filter FL1 passes signals at 600 MHz or less, which are in the frequency bands of a control signal and a Local signal, and blocks signals at 500 MHz or more. Thus, by providing the low pass filters FL1 at the wires CT1 and CT2 illustrated in FIG. 3, a signal in the Sub-6 GHz band can be prevented from being superimposed on a control signal, being superimposed on a Local signal, and propagating from the motherboard 200 to the antenna module 100. By changing the value of a lumped constant, a pass band and a stop band can be adjusted.

Figure 8:
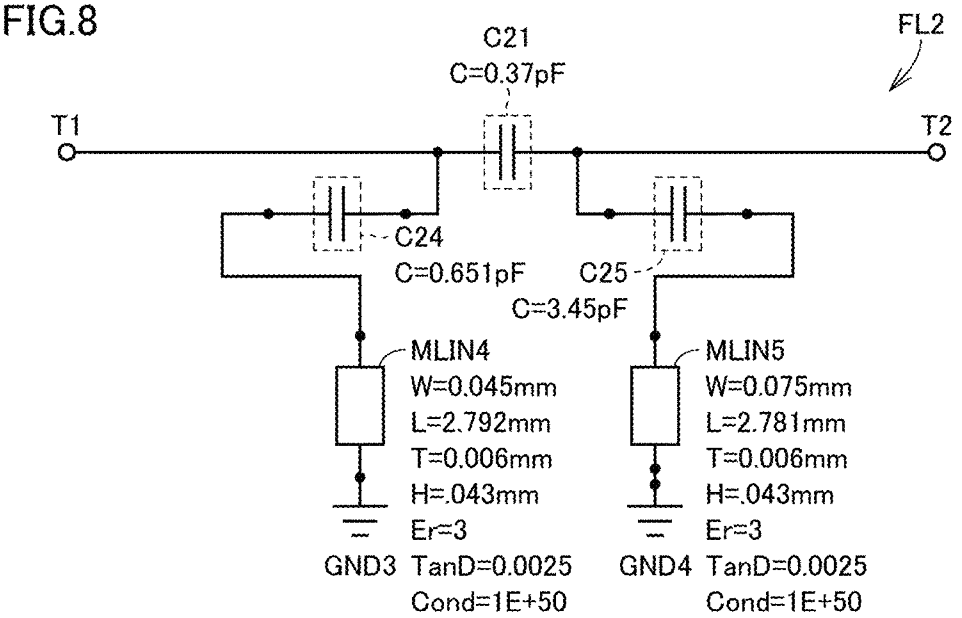
FIG. 8 is a diagram illustrating an example of a high pass filter used for the antenna module.

FIG. 8 is a diagram illustrating an example of a high pass filter FL2 used for the antenna module 100. The high pass filter FL2 includes an input terminal T1, an output terminal T2, capacitors C21, C24, and C25, and short stubs MLIN4 and MLIN5 configuring a parallel resonant circuit. The input terminal T1 corresponds to a terminal 171 of the connector 170. The output terminal T2 corresponds to an input end of the SiP 150 for a wire between the connector 170 and the SiP 150.

The short stubs MLIN4 and MLIN5 are distributed constant lines. Parts corresponding to the short stubs MLIN4 and MLIN5 may be formed in spiral patterns of inductors.

The capacitor C21 is connected between the input terminal T1 and the output terminal T2. The capacitor C24 and the short stub MLIN4 are connected in series between a connection point of the input terminal T1 and the capacitor C21 and the ground terminal GND3. The capacitor C25 and the short stub MLIN5 are connected in series between a connection point of the output terminal T2 and the capacitor C21 and the ground terminal GND4.

The capacitance of the capacitor C21 is 0.37 pF. The capacitance of the capacitor C24 is 0.651 pF. The capacitance of the capacitor C25 is 3.45 pF. The high pass filter FL2 does not necessarily include the capacitors C24 and C25.

The width (W), length (L), thickness (T), and height (H) of the short stub MLIN4 are 0.045 mm, 2.792 mm, 0.006 mm, and 0.043 mm, respectively. The permittivity Er of the short stub MLIN4 is 3. The dielectric loss tangent TanD of the short stub MLIN4 is 0.0025. The conductivity Cond of the short stub MLIN4 is, for example, 1E+50.

The width (W), length (L), thickness (T), and height (H) of the short stub MLIN5 are 0.075 mm, 2.781 mm, 0.006 mm, and 0.043 mm, respectively. The permittivity Er of the short stub MLIN5 is 3. The dielectric loss tangent TanD of the short stub MLIN5 is 0.0025. The conductivity Cond of the short stub MLIN5 is, for example, 1E+50.

Figure 9:
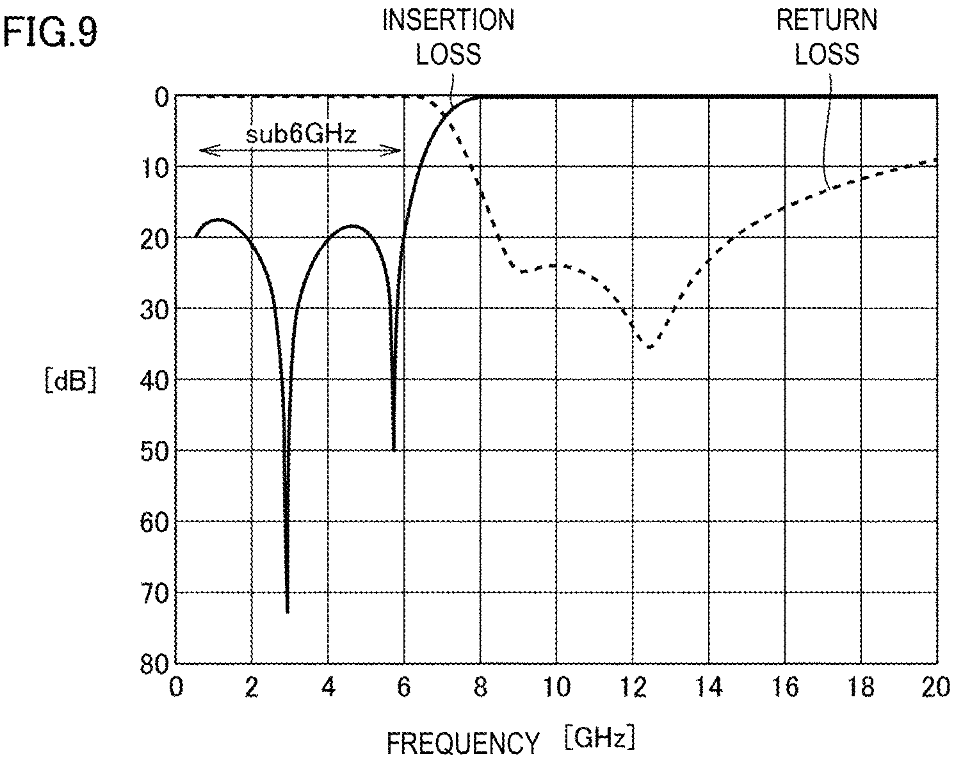
FIG. 9 is a diagram illustrating bandpass characteristics of the high pass filter illustrated in FIG. 8.

FIG. 9 is a diagram illustrating bandpass characteristics of the high pass filter FL2 illustrated in FIG. 8. In FIG. 9, the horizontal axis represents frequency and the vertical axis represents insertion loss and return loss of the high pass filter FL2. As illustrated in FIG. 9, the high pass filter FL2 passes signals at 8 GHz or more, which are in the frequency band of an intermediate frequency signal, and blocks signals at 6 GHz or less.

Thus, by providing the high pass filters FL2 at the wires IF1 and IF2 illustrated in FIG. 3, a signal in the Sub-6 GHz band can be prevented from being superimposed on an intermediate frequency signal and propagating from the motherboard 200 to the antenna module 100.

As described above, in the first embodiment, a filter is provided by not taking into consideration an impact of radio waves transmitted and received by the antenna module 100 supporting a millimeter wave band on a control signal, a Local signal, and an intermediate frequency signal but by taking into consideration radio waves in other frequency bands that may be propagated from an external substrate such as the motherboard 200.

Moreover, in the first exemplary embodiment, radio waves in the Sub-6 GHz band, which is lower than a millimeter wave band, are considered as radio waves in another frequency band. In this case, from the point of view of a control signal and a Local signal, a signal in the Sub-6 GHz band is a signal in a frequency band higher than frequency bands of signals (control signal and Local signal) that should be passed. Furthermore, from the point of view of an intermediate frequency signal, a signal in the Sub-6 GHz band is a signal in a frequency band lower than a frequency band of a signal (intermediate frequency signal) that should be passed.

Thus, in the first exemplary embodiment, the low pass filters FL1 and the high pass filters FL2 with characteristics appropriate for passing a control signal, a Local signal, and an intermediate frequency signal and blocking a signal in the Sub-6 GHz band are adopted. In the first exemplary embodiment, the antenna module 100 capable of reducing the impact of radio waves in the Sub-6 GHz band that may be propagated from an external substrate such as the motherboard 200 and capable of receiving a control signal, a Local signal, and an intermediate frequency signal can be provided.

In the first exemplary embodiment, the radiating elements 120 are, for example, elements of a dual-polarization, dual-band type. However, in the present disclosure, the radiating elements 120 may be elements of a single-polarization, single-band type or elements of a dual-polarization, single-band type. The number of the radiating elements 120 mounted at the antenna module 100 may be one. The connector 170 is an example of an external connection terminal electrically connected to an external substrate such as the motherboard 200. However, in the present disclosure, a surface electrode for the dielectric substrate 130 that is electrically connected to an external substrate with solder or a conductive bonding material interposed therebetween may be used as an external connection terminal.

Second Exemplary Embodiment

Figure 10:
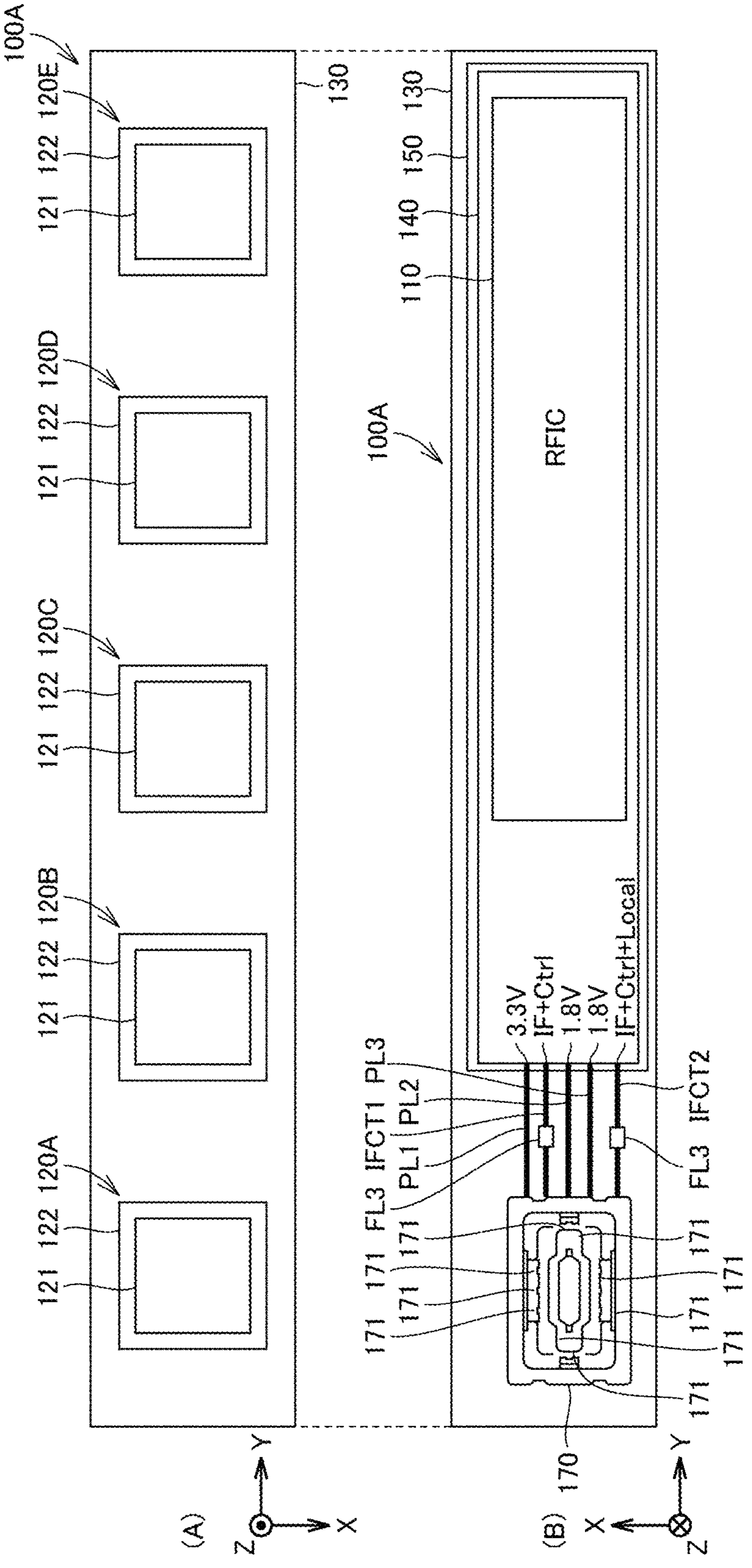
FIG. 10 includes a top view and a bottom view of an antenna module according to a second exemplary embodiment.

FIG. 10 includes a top view and a bottom view of an antenna module 100A according to a second exemplary embodiment. In the antenna module 100A according to the second exemplary embodiment, the wire CT1 (a transmission line for a control signal) and the wire IF1 of the antenna module 100 according to the first exemplary embodiment are integrated into a wire IFCT1, and the wire CT2 (a transmission line for a control signal and a Local signal) and the wire IF2 of the antenna module 100 according to the first exemplary embodiment are integrated into a wire IFCT2.

That is, in the antenna module 100A, an intermediate frequency signal and a control signal are transmitted by the common wire IFCT1. Furthermore, an intermediate frequency signal, a control signal, and a Local signal are transmitted by the wire IFCT2. Band elimination filters FL3 are provided at the wires IFCT1 and IFCT2. The antenna module 100A has a configuration similar to the configuration of the antenna module 100 with the exception of the wires IFCT1 and IFCT2.

According to the second exemplary embodiment, the number of terminals required for the connector 170 can be reduced compared to the first exemplary embodiment.

Figure 11:
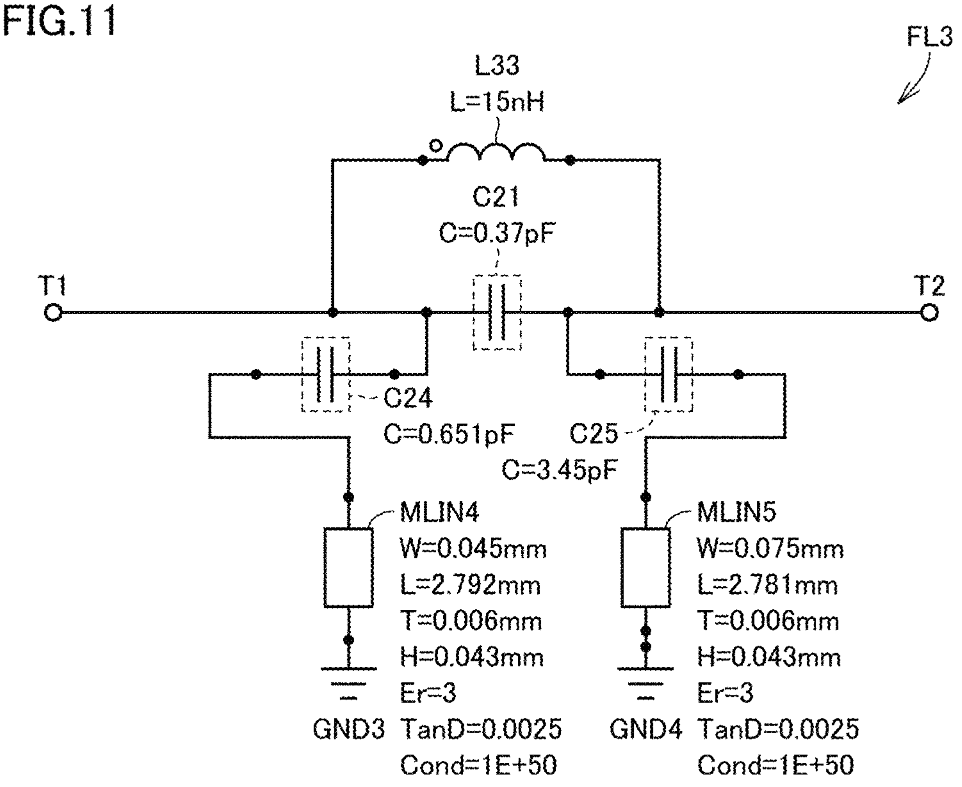
FIG. 11 is a diagram illustrating an example of a band elimination filter used for the antenna module according to the second exemplary embodiment.

FIG. 11 is a diagram illustrating an example of a band elimination filter FL3 used for the antenna module 100A. The band elimination filter FL3 includes an input terminal T1, an output terminal T2, capacitors C21, C24, and C25, and short stubs MLIN4 and MLIN5 configuring a parallel resonant circuit. The input terminal T1 corresponds to a terminal 171 of the connector 170. The output terminal T2 corresponds to an input end of the SiP 150 for a wire between the connector 170 and the SiP 150.

The band elimination filter FL3 has a configuration in which an inductor L33 is connected in parallel to the capacitor C21 in the circuit configuration of the high pass filter FL2 illustrated in FIG. 9. The inductance of the inductor L33 is 15 nH.

A control signal, a Local signal, and an intermediate frequency signal are superimposed on one another and input to the input terminal T1. The capacitor C21 and the short stubs MLIN4 and MLIN5 pass the intermediate frequency signal and block signals at frequencies lower than or equal to the Sub-6 GHz band. The inductor L33 passes the control signal and the Local signal and blocks signals at frequencies equal to or higher than the Sub-6 GHz band. The control signal, the Local signal, and the intermediate frequency signal output from the output terminal T2 are input into the SiP 150.

Figure 12:
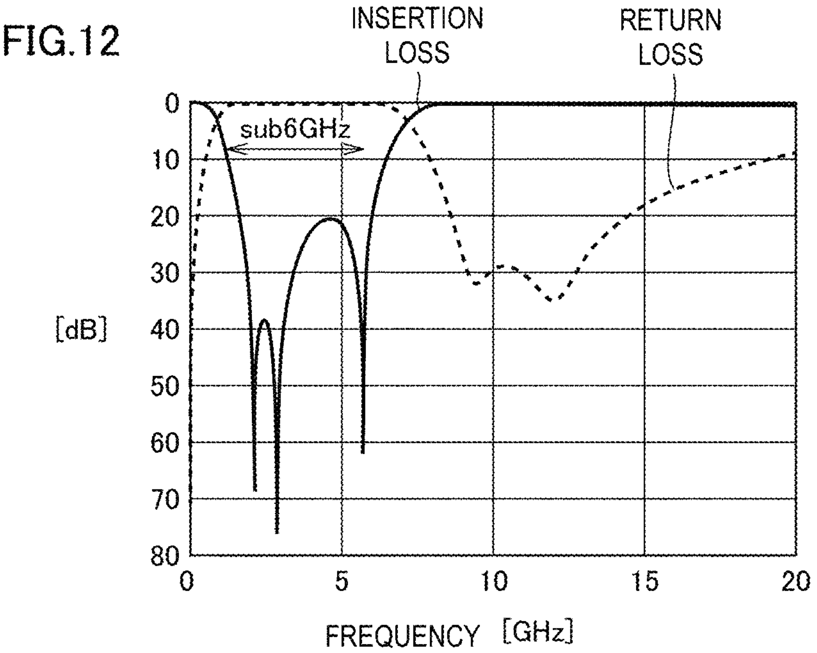
FIG. 12 is a diagram illustrating bandpass characteristics of the band elimination filter illustrated in FIG. 11.

FIG. 12 is a diagram illustrating bandpass characteristics of the band elimination filter FL3 illustrated in FIG. 11. In FIG. 12, the horizontal axis represents frequency and the vertical axis represents insertion loss and return loss of the band elimination filter FL3.

As illustrated in FIG. 12, the band elimination filter FL3 passes signals at 600 MHz or less, which are in the frequency bands of a control signal and a Local signal, passes signals at 8 GHz or more, which are in the frequency band of an intermediate frequency signal, and blocks signals in a frequency band from 600 MHz to 6 GHz. Thus, by providing the band elimination filters FL3 at the wires IFCT1 and IFCT2 illustrated in FIG. 10, a signal in the Sub-6 GHz band can be prevented from being superimposed on a control signal and an intermediate frequency signal, being superimposed on a Local signal, and propagating from the motherboard 200 to the antenna module 100.

First Exemplary Modification

Figure 13:
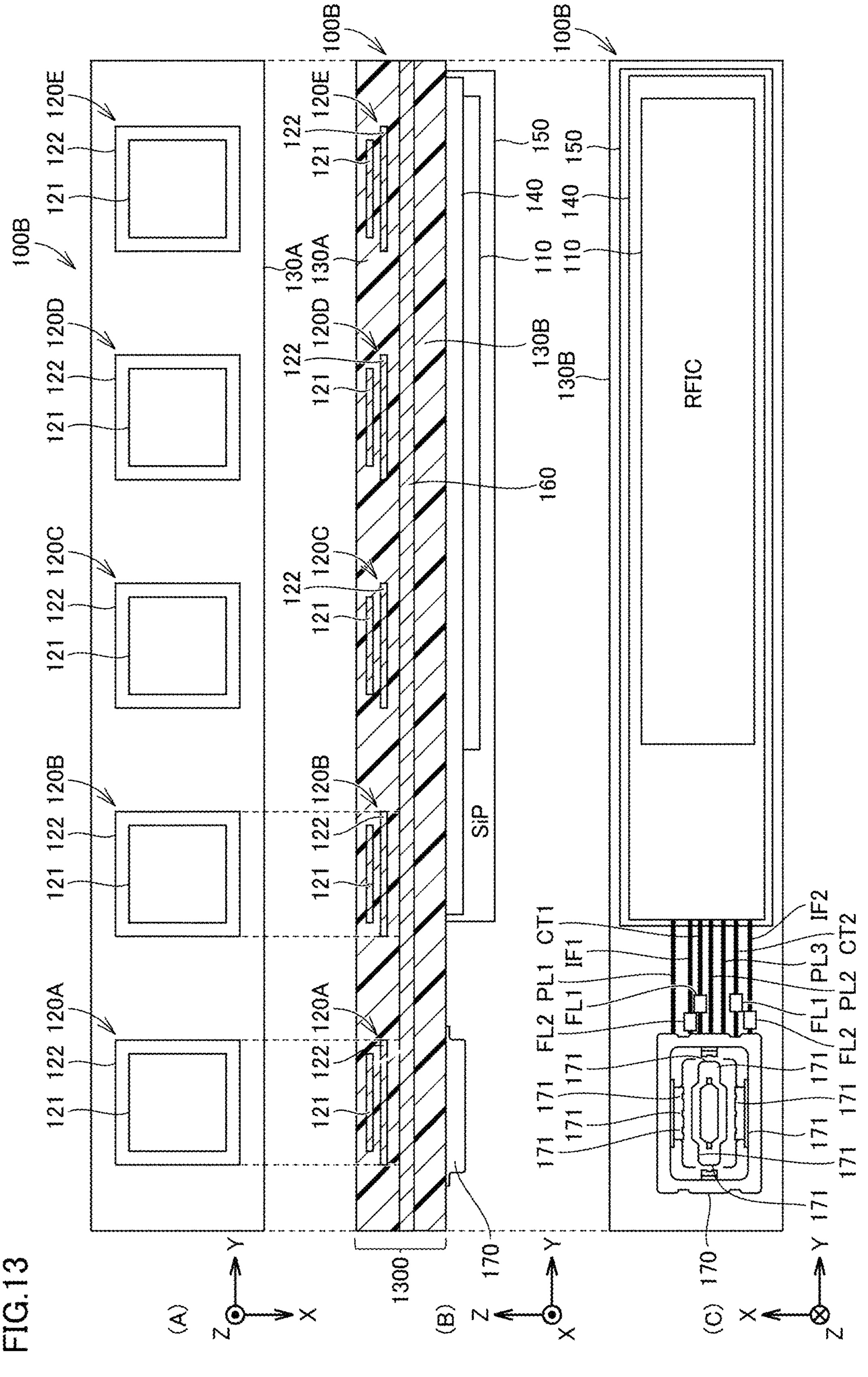
FIG. 13 includes diagrams for explaining an antenna module according to a first exemplary modification.

FIG. 13 includes diagrams for explaining an antenna module 100B according to a first exemplary modification. In the antenna module 100B, a dielectric substrate 1300 at which the radiating elements 120A to 120E are mounted includes a dielectric substrate 130A, a dielectric substrate 130B, and a bonding layer 160 for bonding the dielectric substrate 130A and the dielectric substrate 130B. As described above, the radiating elements 120A to 120E are not necessarily mounted at a single substrate and may be mounted at a plurality of substrates.

In FIG. 13(B), illustration of the wires CT1, CT2, IF1, IF2, PL1, PL2, and PL3 is omitted. For example, these wires are formed inside the dielectric substrate 130B.

Second Exemplary Modification

Figure 14:
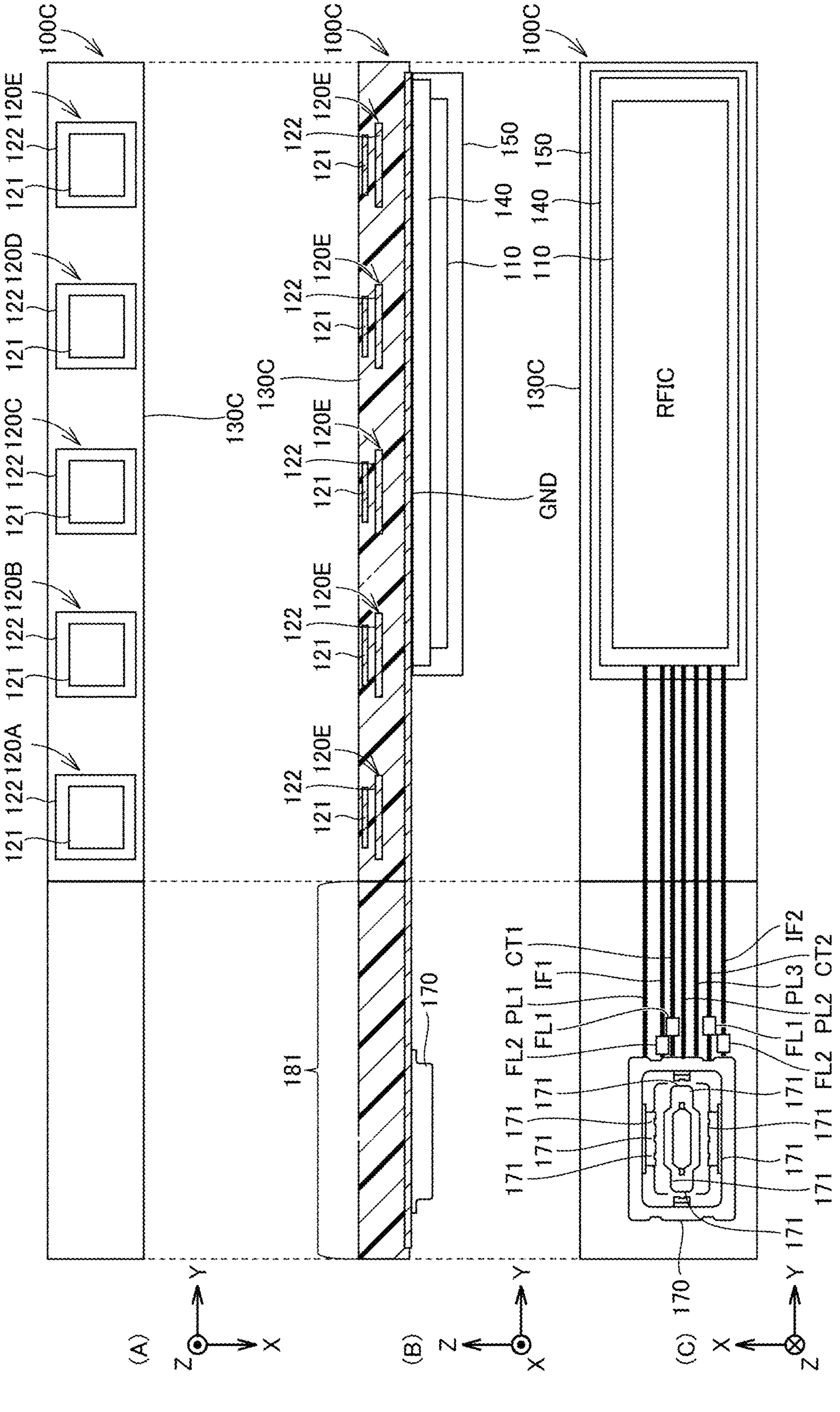
FIG. 14 includes diagrams for explaining an antenna module according to a second exemplary modification.

FIG. 14 includes diagrams for explaining an antenna module 100C according to a second exemplary modification. In the antenna module 100C, a dielectric substrate 130C at which the radiating elements 120A to 120E are mounted is formed by bonding a rigid substrate and a flexible substrate. That is, part of the dielectric substrate 130C is configured as a flexible part 181. In FIG. 14(B), illustration of the wires CT1, CT2, IF1, IF2, PL1, PL2, and PL3 is omitted as in FIG. 13(B).

When seen in plan view from a normal line direction of the dielectric substrate 130C, the connector 170 is disposed in the flexible part 181. When seen in plan view from the normal line direction of the dielectric substrate 130C, the SiP 150 including the RFIC 110 and the radiating elements 120A to 120E are disposed in a part corresponding to the rigid substrate of the dielectric substrate 130C other than the flexible part 181.

Third Exemplary Modification

Figure 15:
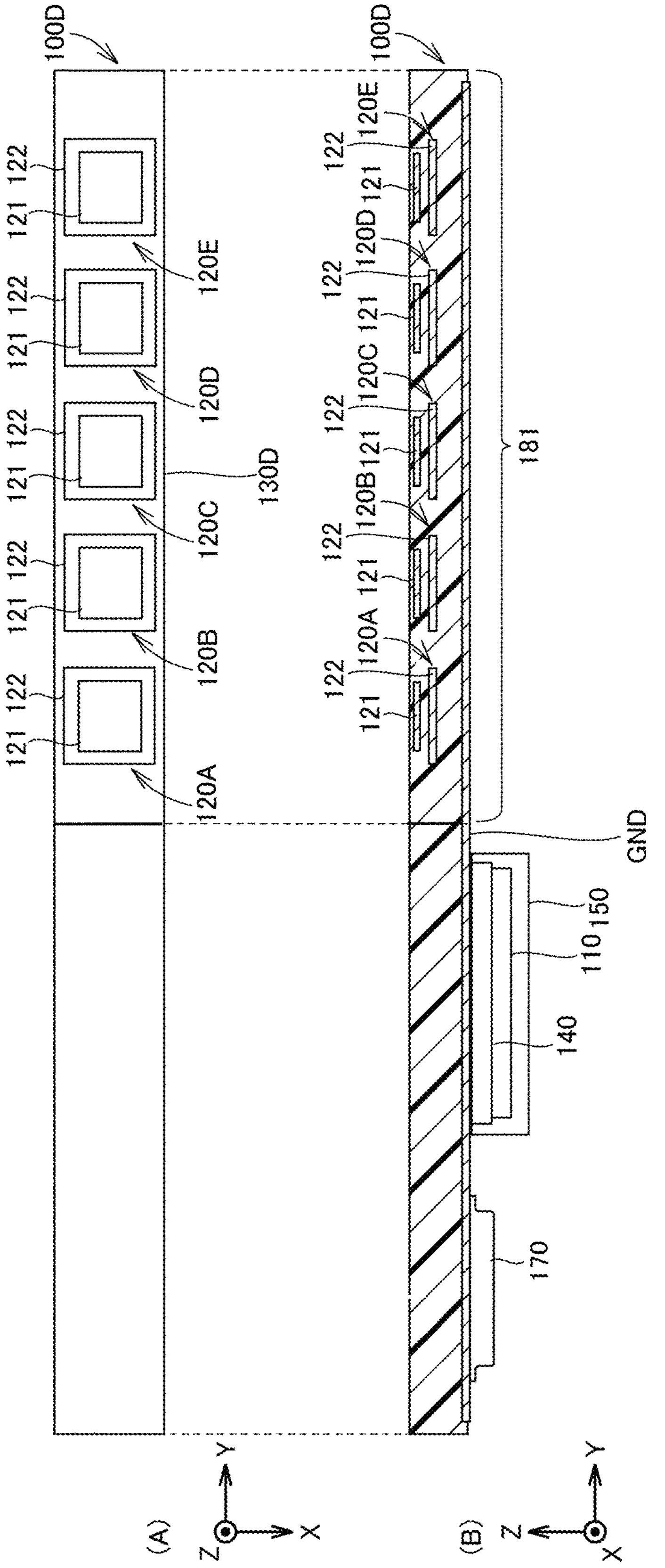
FIG. 15 includes diagrams for explaining an antenna module according to a third exemplary modification.

FIG. 15 includes diagrams for explaining an antenna module 100D according to a third exemplary modification. The antenna module 100D is configured such that part of a dielectric substrate 130D is a flexible part 181, similarly to the antenna module 100C according to the exemplary second modification.

When seen in plan view from a normal line direction of the dielectric substrate 130D, the radiating elements 120A to 120E are disposed in the flexible part 181. When seen in plan view from the normal line direction of the dielectric substrate 130D, the SiP 150 including the RFIC 110 and the connector 170 are disposed in a part corresponding to the rigid substrate of the dielectric substrate 130D other than the flexible part 181.

In FIG. 15(B), illustration of the wires CT1, CT2, IF1, IF2, PL1, PL2, and PL3 is omitted as in FIG. 13(B). Furthermore, although the bottom view of the antenna module 100D is omitted in FIG. 15, the wires CT1, CT2, IF1, IF2, PL1, PL2, and PL3 illustrated in FIG. 14(C) are disposed between the connector 170 and the SiP 150.

The exemplary embodiments disclosed herein are to be considered in all respects to be illustrative and not restrictive. The scope of the present disclosure is defined by the claims, rather than the exemplary embodiments described above, and is intended to include all modifications within the meaning and scope equivalent to the scope of the claims.

REFERENCE SIGNS LIST

10 communication apparatus, 100, 100A, 100B, 100C, 100D, and 300 antenna module, 110 and 110A to 110D RFIC, 111A to 111E, 113A to 113E, and 117 switch, 112AR to 112ER low noise amplifier, 112AT to 112ET power amplifier, 114A to 114D attenuator, 115A to 115D phase shifter, 116A signal multiplexer/demultiplexer, 118A mixer, 119A amplifying circuit, 121 and 122 patch antenna, 120 and 120A to 120E radiating element, 130, 130A, 130B, 130C, 130D, and 1300 dielectric substrate, 131 to 134 power supply wire, 140 substrate, 150 SiP, 160 bonding layer, 170 connector, 171 terminal, 180 flexible substrate, 181 flexible part, 200 motherboard, 210 BBIC, C11, C12, C21, C24, and C25 capacitor, CT1, CT2, IF1, IF2, IFCT1, IFCT2, and PL1 to PL3 wire, FL1 low pass filter, FL2 high pass filter, FL3 band elimination filter, GND ground electrode, GND3 and GND4 ground terminal, L11, L12, L13, and L33 inductor, MLIN4 and MLIN5 short stub, SP1 to SP4 power supply point, T1 input terminal, T2 output terminal.

The invention claimed is:

1. An antenna module comprising:

a radiating element that emits a radio wave in a first frequency band;

a first substrate at which the radiating element is disposed;

a power supply circuit that is connected to the radiating element;

an external connection terminal that is electrically connected to an external substrate;

a transmission line that is connected between the external connection terminal and the power supply circuit and that transmits a control signal and an intermediate frequency signal from the external connection terminal to the power supply circuit, the control signal being output from the external substrate and received at the external connection terminal, and the intermediate frequency signal corresponding to the radio wave emitted from the radiating element and received at the external connection terminal; and a filter circuit that is provided at the transmission line at a position between the external connection terminal and the power supply circuit and that blocks a signal in a second frequency band, wherein the second frequency band is lower than a frequency band of the intermediate frequency signal and higher than a frequency band of the control signal.

2. The antenna module according to claim 1, wherein the transmission line transmits the control signal superimposed on the intermediate frequency signal, and wherein the filter circuit includes a third filter circuit including a band elimination filter that blocks a signal in the second frequency band.

3. The antenna module according to claim 2, wherein the transmission line transmits a Local signal superimposed on the control signal and the intermediate frequency signal, wherein the Local signal is multiplied by the intermediate frequency signal, and wherein the Local signal is a signal in a millimeter wave band.

4. The antenna module according to claim 1, wherein the power supply circuit includes a radio-frequency integrated circuit (RFIC) that converts the intermediate frequency signal into a signal in the first frequency band in accordance with the control signal.

5. The antenna module according to claim 1, wherein the frequency band of the intermediate frequency signal falls within a range from 8 GHz to 15 GHz.

6. The antenna module according to claim 1, wherein the first frequency band falls within a range from 24 GHz to 43 GHz.

7. The antenna module according to claim 1, wherein the second frequency band falls within a range from 500 MHz to 6 GHz.

8. The antenna module according to claim 1, wherein the frequency band of the control signal falls within a range of 600 MHz or less.

9. The antenna module according to claim 1, further comprising a second substrate at which the power supply circuit is disposed.

10. The antenna module according to claim 1, wherein the first substrate includes a plurality of substrates, and wherein the radiating element is mounted at the plurality of substrates.

11. The antenna module according to claim 1, wherein the first substrate includes a rigid substrate and a flexible substrate.

12. A communication apparatus, comprising:

the antenna module according to claim 1; and the external substrate, wherein the external substrate transmits a signal in the second frequency band.

13. An antenna module comprising:

a radiating element that emits a radio wave in a first frequency band;

a first substrate at which the radiating element is disposed;

a power supply circuit that is connected to the radiating element;

an external connection terminal that is electrically connected to an external substrate;

a transmission line that is connected between the external connection terminal and the power supply circuit and that transmits a control signal and an intermediate frequency signal from the external connection terminal to the power supply circuit, the control signal being output from the external substrate and received at the external connection terminal, and the intermediate frequency signal corresponding to the radio wave emitted from the radiating element and received at the external connection terminal; and a filter circuit that is provided at the transmission line at a position between the external connection terminal and the power supply circuit and that blocks a signal in a second frequency band, wherein the second frequency band is lower than a frequency band of the intermediate frequency signal and higher than a frequency band of the control signal, wherein the transmission line includes a first line that transmits the control signal and a second line that transmits the intermediate frequency signal, and wherein the filter circuit includes:

a first filter circuit that is provided at the first line and blocks a signal at a frequency higher than the frequency band of the control signal, and a second filter circuit that is provided at the second line and blocks a signal at a frequency lower than the frequency band of the intermediate frequency signal.

14. The antenna module according to claim 13, wherein the first line transmits a Local signal superimposed on the control signal, wherein the Local signal is multiplied by the intermediate frequency signal, and wherein the Local signal is a signal in a millimeter wave band.

15. The antenna module according to claim 13, wherein the second line transmits a Local signal superimposed on the intermediate frequency signal, wherein the Local signal is multiplied by the intermediate frequency signal, and wherein the Local signal is a signal in a millimeter wave band.

16. The antenna module according to claim 13, wherein the power supply circuit includes a radio-frequency integrated circuit (RFIC) that converts the intermediate frequency signal into a signal in the first frequency band in accordance with the control signal.

17. An antenna module comprising:

a radiating element that emits a radio wave in a first frequency band;

a first substrate at which the radiating element is disposed;

a power supply circuit that is connected to the radiating element;

an external connection terminal that is electrically connected to an external substrate;

a common transmission line that is connected between the external connection terminal and the power supply circuit and that transmits both a control signal and an intermediate frequency signal from the external connection terminal to the power supply circuit, the control signal being output from the external substrate and received at the external connection terminal, and the intermediate frequency signal corresponding to the radio wave emitted from the radiating element and received at the external connection terminal; and a filter circuit that is provided at the transmission line at a position between the external connection terminal and the power supply circuit and that blocks a signal in a second frequency band, wherein the second frequency band is lower than a frequency band of the intermediate frequency signal and higher than a frequency band of the control signal.

18. The antenna module according to claim 17, wherein the transmission line transmits the control signal superimposed on the intermediate frequency signal, and wherein the filter circuit includes a third filter circuit including a band elimination filter that blocks a signal in the second frequency band.

19. The antenna module according to claim 17, wherein the transmission line transmits a Local signal superimposed on the control signal and the intermediate frequency signal, wherein the Local signal is multiplied by the intermediate frequency signal, and wherein the Local signal is a signal in a millimeter wave band.

20. The antenna module according to claim 17, wherein the power supply circuit includes a radio-frequency integrated circuit (RFIC) that converts the intermediate frequency signal into a signal in the first frequency band in accordance with the control signal.

* * * * *